United States Patent [19]

Kubota et al.

[11] 4,001,532
[45] Jan. 4, 1977

[54] SEAT BELT BUCKLE SWITCH HAVING SLIDABLE ACTUATOR AND BRIDGING CONTACT WIRE

[75] Inventors: Tatsushi Kubota; Akinori Fujiwara, both of Aichi, Japan

[73] Assignees: Toyota Jidosha Kogyo Kabushiki Kaisha, Toyota, Aichi; Kabushiki-Kaisha Tokai-Rika-Denki-Seisakusho, Nishikasugai, Aichi, both of Japan

[22] Filed: June 20, 1975

[21] Appl. No.: 588,632

[30] Foreign Application Priority Data

June 21, 1974  Japan ............. 49-73597[U]

[52] U.S. Cl. ............ 200/61.58 B; 200/16 D; 200/252; 24/230 A
[51] Int. Cl.² ............ H01H 3/16; H01H 1/36; A44B 19/00
[58] Field of Search ... 200/16 D, 61.58 B, 237–261

[56] References Cited

UNITED STATES PATENTS

| | | | |
|---|---|---|---|
| 3,166,146 | 1/1965 | Shaw | 200/61.58 B X |
| 3,225,149 | 12/1965 | Shlesinger, Jr. | 200/16 D |
| 3,756,339 | 9/1973 | Cornelison, Jr. et al. | 200/61.58 B X |
| 3,781,497 | 12/1973 | Stephenson et al. | 200/61.58 B |
| 3,833,781 | 9/1974 | Kumpf | 200/61.58 B |
| 3,840,849 | 10/1974 | Lohr | 200/61.58 B X |
| 3,890,003 | 6/1975 | Close | 200/61.58 B X |

*Primary Examiner*—James R. Scott
*Attorney, Agent, or Firm*—Karl W. Flocks

[57] ABSTRACT

A buckle for safety belt comprising means for releasably locking in locked position a tongue plate inserted into the buckle body through an insertion opening, a slider disposed in the buckle body to be moved against the force of a spring by being urged by the inserted tongue plate, a contact pin extending through the slider to protrude from the opposite side faces thereof, and a pair of stationary contact strips disposed on opposite sides of the slider in the buckle body to be simultaneously engaged by or disengaged from the contact pin with the sliding movement of the slider.

5 Claims, 7 Drawing Figures

SEAT BELT BUCKLE SWITCH HAVING SLIDABLE ACTUATOR AND BRIDGING CONTACT WIRE

BACKGROUND OF THE INVENTION

This invention relates to buckles for safety belts used for releasably fixing the human body to the seat of vehicles such as automobiles. More particularly, this invention relates to a buckle of the type which is fixed to one end of one of a pair of safety belt straps in an automobile so that starting of the engine of the automobile by the ignition key cannot take place until a tang plate secured to the free end of the other safety belt strap is inserted completely into the buckle to actuate a switch in the buckle by driving a slider mounted slidably within the buckle, thereby an electrical signal for displaying complete wearing of the safety belt on the human body is generated and supplied to an alarm means incorporated in the dashboard or thereby an associated ignition switch circuit is closed.

Prior art buckles of this type for use with the safety belts have been defective in that the switch structure is quite complex and the large overall size results in a high manufacturing cost.

SUMMARY OF THE INVENTION

It is a primary object of the present invention to provide a novel and improved buckle of this kind which includes an inexpensive switch of simple construction and small size which can be easily mounted to the bottom plate of the buckle as an integral part of the buckle.

The buckle for safety belt strap according to the present invention is featured by the provision of means for releasably locking in locked position a tongue plate inserted into the buckle body through an insertion opening, a slider disposed in the buckle body to be moved against the force of a spring by being urged by the inserted tongue plate, a contact pin extending through the slider to protrude from the opposite side faces thereof, and a pair of stationary contact strips disposed on opposite sides of the slider in the buckle body to be simultaneously engaged by or disengaged from the contact pin with the sliding movement of the slider.

DETAILED DESCRIPTION OF THE INVENTION

Figure 1:
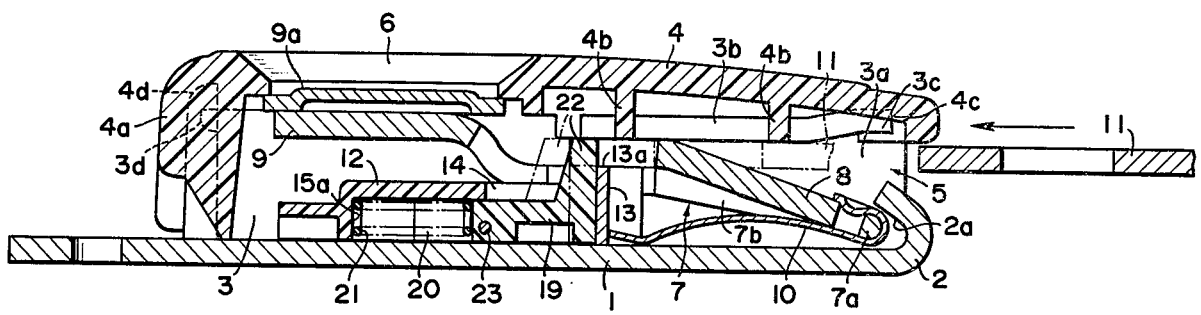
FIG. 1 is a longitudinal sectional view of a buckle for safety belt according to the present invention, in which the solid lines and chain lines represent respectively the state of the buckle before and after the insertion of a tongue plate therein.

Referring to FIG. 1, a buckle for safety belt according to an embodiment of the present invention comprises a bottom plate 1, and one end portion (the right-hand end portion in FIG. 1) of this bottom plate 1 is bent upwardly and then inwardly to form a curved engaging portion 2 which is engaged by one end portion of a locking lever described later. One end of one of a pair of safety belt straps (not shown) is secured in usual manner to the other end portion of the bottom plate 1 of the buckle. A pair of spaced upstanding walls 3 extend from the opposite sides of the bottom plate 1 as an integral part of the bottom plate 1. The upper edge portion of the front half 3a of each of these upstanding walls 3 is bent inwardly substantially normal to the wall body to form a horizontally inwardly protruding flange 3b. The front end portion of each flange 3b is inclined slightly upward to serve as an engaging lug 3c. A buckle cover 4 of synthetic resin is snugly fitted on the bottom plate 1 to constitute a buckle casing together with the bottom plate 1. This buckle cover 4 comprises a top wall, a pair of spaced depending side walls making intimate face-to-face engagement with the outer surfaces of the upstanding walls 3 of the bottom plate 1, a depending rear wall 4a, and a plurality of reinforcing ribs 4b formed on the inner surface of the top wall. In order that the buckle cover 4 can be fixed in a predetermined position to the bottom plate 1, the buckle cover 4 comprises further a recess 4c engaged by the engaging lugs 3c of the horizontally inwardly protruding flanges 3b of the bottom plate 1 and another recess 4d engaged by similar engaging lugs 3d formed at the rear end of the upstanding walls 3 of the bottom plate 1. A space is defined between the buckle cover 4 of synthetic resin and the bottom plate 1 when this buckle cover 4 is snap-fitted on the bottom plate 1 of the buckle utilizing the resiliency of the synthetic resin. An opening 5 is formed at the front end of the buckle cover 4 between the curved engaging portion 2 of the bottom plate 1 and the corresponding portion of the top wall of the buckle cover 4 so that a tang plate 11 secured to the free end of the other safety belt strap can be inserted into the buckle casing through this opening 5 and locked in the inserted position in the buckle. Further, a slot 6 is bored in the top wall of the buckle cover 4 so that manipulation for unlocking the tang plate 11 from the locked position can be made through this slot 6.

A locking lever 7 is disposed in the space defined between the buckle cover 4 and the bottom plate 1 of the buckle. This locking lever 7 has a transverse width substantially equal to that of the bottom plate 1 of the buckle and comprises a portion in the form of a plate 7b which can make swinging movement around one of the longitudinal ends 7a engaged by the curved inner surface 2a of the curved engaging portion 2 of the bottom plate 1 of the buckle. The locking lever 7 comprises further a locking portion 8 and a pair of lever arms 9. The locking portion 8 has a central portion projecting beyond the upper surface of the plate 7b so as to protrude in the path of the tongue plate 11 which is inserted into the buckle casing through the insertion opening 5 in the direction of the arrow shown in FIG. 1. The lever arms 9 are branched from the plate 7b to extend to a position beneath the top wall portion of the buckle cover 4 in which the unlocking manipulation slot 6 is bored. An unlocking force receiving plate 9a is fixed in usual manner to the lever arms 9 opposite to the unlocking manipulation slot 6 and has a surface area greater than that of the slot 6.

A leaf spring 10 is anchored at one end thereof to the end 7a of the locking lever 7 and is in pressure contact at the other end thereof with a lower part of a supporting portion 13 formed as an integral part of the front end of a switch bracket described later. Thus, this leaf spring 10 acts to normally urge the locking lever 7 upward so that the locking lever 7 can make swinging movement in the counterclockwise direction in FIG. 1 around the end 7a engaged by the curved engaging portion 2 of the bottom plate 1 when the unlocking force receiving plate 9a underlying the slot 6 is forced downward from the exterior or when the locking portion 8 of the locking lever 7 is forced downward by the tongue plate 11 inserted through the insertion opening 5 of the buckle casing. The upper edge 13a of the supporting portion 13 serves to support the leading end portion of the tongue plate 11 inserted through the insertion opening 5 of the buckle casing.

Figure 2:
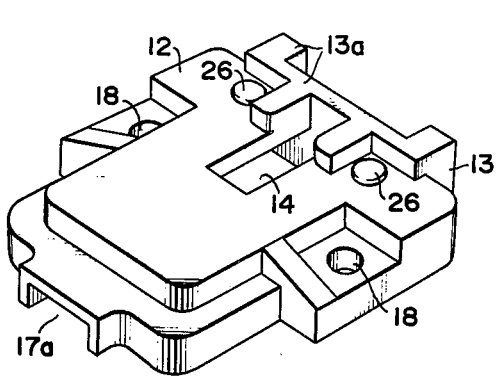
FIG. 2 is a perspective view of a switch bracket employed in the buckle shown in FIG. 1.
Figure 3:
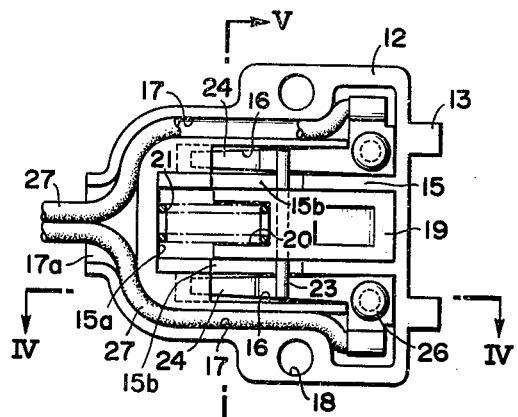
FIG. 3 is a bottom plan view of the switch bracket shown in FIG. 2, with current conducting cords connected to stationary contact strips being partly cut away.

A switch bracket 12 of synthetic resin having an open bottom as clearly shown in FIG. 2 is securely fixed to the bottom plate 1 beneath the unlocking force receiving plate 9a and is electrically insulated from the bottom plate 1 by a sheet of electrical insulator (not shown). The upper edge 13a of the supporting portion 13 for supporting the leading end portion of the tang plate 11 inserted to be locked by the locking lever 7 in the buckle casing projects slightly upward beyond the upper surface of the front end of the switch bracket 12 as seen in FIG. 2. A guide slot 14 of rectangular shape is bored in the top wall of the switch bracket 12 at a position behind the supporting portion 13, and a pair of guide ridges 15 are formed as an integral part of the switch bracket 12 to extend in parallel with each other. These guide ridges 15 depend from the lower surface of the top wall of the switch bracket 12 along the opposite sides of the guide slot 14 and extend rearward to terminate in a transverse wall surface 15a as shown in FIG. 3. Therefore, a recess is formed in the switch bracket 12 by the confronting inner surfaces of the guide ridges 15, the transverse wall surface 15a, and the inner wall surface of the lower part of the supporting portion 13 opposite to the transverse wall surface 15a. The central portion of each of these guide ridges 15 is cut out over a suitable length as shown by 15b in FIG. 3.

A pair of stationary contact mounting portions 16 are provided outside the respective guide ridges 15 in the switch bracket 12, and a pair of cord receiving grooves 17 are provided outside the respective mounting portions 16 in the switch bracket 12. These cord receiving grooves 17 join together at the rear end 17a of the switch bracket 12. The reference numeral 18 designates holes bored in the top wall of the switch bracket 12 so that the switch bracket 12 can be fixed to the buckle bottom plate 1 by any suitable fixing means such as screws (not shown).

Figure 6:
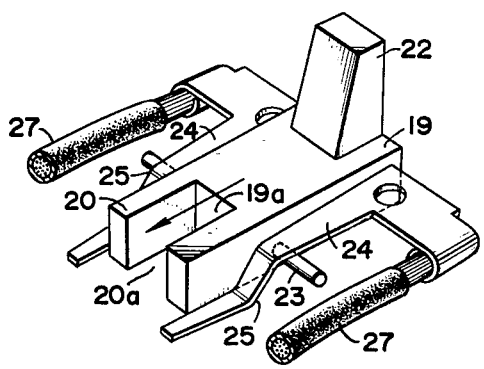
FIG. 6 is an enlarged perspective view to clearly show the relation between the stationary contact strips and a slider in the buckle according to the present invention.

As shown clearly in FIG. 6, a slider 19 is a rectangular member of synthetic resin and has an integral knob 22 extending upward from the front end thereof. Further, a longitudinal cut-out 20a is formed between a pair of side wall portions 20 at the rear end of the slider 19. A contact pin 23 of conductive material extends transversely through the body of the slider 19 to protrude from the opposite side surfaces thereof in a direction normal to the longitudinal axis thereof and is fixed to the slider 19. The slider 19 is fitted between the guide ridges 15 in the switch bracket 12 so as to be freely slidable in the longitudinal direction, and the knob 22 protrudes from the guide slot 14 in the switch bracket 12 with its upper end located beyond the upper edge 13a of the supporting portion 13. Thus, when the tongue plate 11 is inserted into the buckle casing, the knob 22 is engaged by the leading end of the tongue plate 11 to be shifted from the position shown by the solid lines to the position shown by the chain lines in FIG. 1. A helical compression spring 21 is disposed between the inner end surface 19a of the cut-out 20a in the slider 19 and the transverse wall surface 15a in the switch bracket 12. This compression spring 21 acts to normally urge the slider 19 toward the supporting portion 13 of the switch bracket 12, that is, toward the right in FIG. 1.

Figure 4:
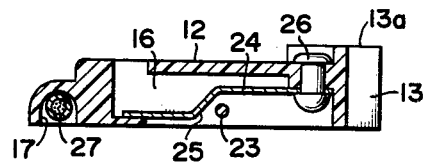
FIG. 4 is a sectional view of the switch bracket shown in FIG. 2, the section being taken along the line IV—IV in FIG. 3 to show the internal structure when viewed in the direction of the arrow.
Figure 5:
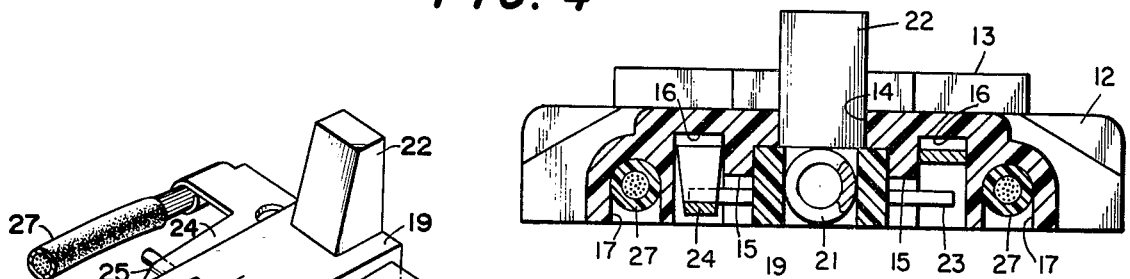
FIG. 5 is a sectional view in an enlarged scale of the switch bracket shown in FIG. 2, the section being taken along the line V—V in FIG. 3 to show the internal structure when viewed in the direction of the arrow, with the right-hand side stationary contact strip being removed for better understanding of the internal structure.

A pair of resilient stationary contact strips 24 of conductive material are fixed at a suitable portion thereof to the front part of the corresponding mounting portions 16 in the switch bracket 12 by means such as a caulking rivet 26 and at another suitable portion thereof to the body of the switch bracket 12. As clearly shown in FIGS. 4 and 6, each of these stationary contact strips 24 is formed with a downwardly bent portion or stepped portion 25 at the rear end thereof. These bent portions or stepped portions 25 are disposed relative to the movable contact pin 23 in such a relation that, when the slider 19 normally urged by the compression spring 21 is maintained in the solid line position in FIG. 1, the movable contact pin 23 is prevented from contact with the stationary contact strips 24 as seen in FIG. 4, while when the slider 19 is shifted by the inserted tongue plate 11 to the chain line position in FIG. 1 against the force of the compression spring 21, the movable contact pin 23 is brought into contact with the stationary contact strips 24 to close an ignition switch circuit (not shown).

A pair of current conducting cords 27 are pressed into the corresponding cord receiving grooves 17 from beneath. These cords 27 are fixed at one end thereof to the corresponding stationary contact strips 24 and are connected at the other end thereof to a power source (not shown).

In the embodiment described with reference to FIGS. 1 to 6, the contact pin 23 is kept away from contact with anyone of the stationary contact strips 24 when the safety belt is not fitted on the human body, due to the fact that the slider 19 is maintained in the solid line position in FIG. 1 by the force of the compression spring 21. However, when the tongue plate 11 is inserted into the buckle casing through the insertion opening 5 to engage with and force rearward the knob 22 protruding in the moving path of the tongue plate 11, the slider 19 is shifted toward the chain line position in FIG. 1 against the force of the compression spring 21, and the contact pin 23 is brought into contact with the bent portions or stepped portions 25 of the stationary contact strips 24 to establish an electrical path therebetween thereby turning on the switch.

Thus, the engine of the automobile can be started by turning the ignition key subsequently.

Figure 7:
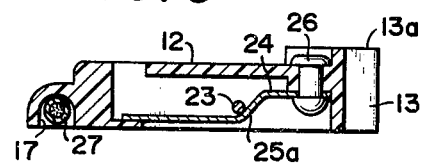
FIG. 7 is a view similar to FIG. 4, but showing another switch structure according to the present invention in which the switch is of the normally-closed type.

The aforementioned embodiment of the present invention has referred to a buckle having a normally-open switch structure therein. Thus, this switch is turned on when the contact pin 23 is brought into contact with one surface of the stationary contact strips 24. A normally-closed switch structure as shown in FIG. 7 may be employed in lieu of the normally-open switch structure above described. Referring to FIG. 7, the bent portions or stepped portions 25 of the stationary contact strips 24 are formed in such a position that the contact pin 23 is normally in contact with the other surface of the bent portions or stepped portions 25 of the stationary contact strips 24 in the state in which the tongue plate 11 is not inserted into the buckle casing. Thus, in response to the insertion of the tongue plate 11 into the buckle casing, the slider 19 is urged relative to the stationary contact strips 24 against the force of the compression spring 21, and the contact pin 23 is moved away from the engaging position with the stationary contact strips 24 thereby turning off the switch.

It will be understood from the foregoing detailed description clarifying the structure and function of an embodiment of the present invention that a miniature switch suitable for incorporation within a narrow space in a buckle casing is constituted by a contact pin 23 extending through a slider 19 to protrude from the opposite side surfaces thereof, and a pair of stationary contact strips 24 disposed on opposite sides of the slider 19, so that the switch can be turned on or off in response to the sliding movement of the slider 19 caused by the force imparted by a tongue plate inserted into the buckle casing. Therefore, the switch can be easily manufactured at a low cost and can be simply mounted on the bottom plate of the buckle by virtue of the small size and compact structure thereof. The buckle according to the present invention is therefore advantageous over prior art ones of this kind in that it is quite inexpensive and incorporates therein a switch which operates reliably after complete wearing of the safety belt on the human body, that is, after complete insertion of the tongue plate into the buckle casing.

What is claimed is:

1. A seat belt buckle having a switch assembly comprising:
   a bottom plate having a pair of upstanding walls extending from the opposite sides thereof respectively;
   a buckle cover adapted to be snugly fitted on and fixed to said bottom plate to constitute together with said bottom plate a buckle casing having an internal space therein, said buckle casing being provided at one end thereof with an opening for the insertion of a tongue plate, said buckle cover being provided in the top wall thereof with a slot for the unlocking manipulation on said tongue plate inserted through said insertion opening;
   a switch bracket having an open bottom and fixed to said bottom plate within the internal space of said buckle casing, and including a pair of stationary contact strips secured to said switch bracket, and a longitudinal guide slot bored in the top wall of the switch bracket;
   a slider mounted to said switch bracket to be slidable relative to said switch bracket in the longitudinal direction thereof and having a contact pin extending therethrough and protruding from the opposite side surfaces thereof in a direction substantially normal to the longitudinal axis thereof, an upstanding knob formed at the front end of said slider and projecting through the longitudinal guide slot bored in said switch bracket into an interference contact position with said tongue plate to be inserted and a longitudinal cut-out formed between a pair of side wall portions of the rear end of said slider;
   a coiled compression spring means disposed between the inner end of said cut-out in said slider and the rear wall of said switch bracket for urging said slider normally to be maintained in one of two predetermined positions, whereby with the insertion of said tongue plate through said insertion opening of said buckle casing, said knob is engaged and urged by the leading end of said tongue plate to be moved along said guide slot and simultaneously said slider being moved in a parallel direction with the movement of the inserted tongue plate relative to said switch bracket to the other of said predetermined position against the force of said spring means thereby bringing said protruding contact pin to the other of said predetermined positions; and
   a locking lever for locking said tongue plate in inserted position, said locking lever being provided with means for receiving an unlocking force imparted thereto for the purpose of unlocking said inserted tongue plate from the locked position.

2. A buckle for safety belt as claimed in claim 1, wherein a supporting portion is formed integrally with the front end of said switch bracket so as to support the leading end portion of said tongue plate inserted into said buckle casing.

3. A buckle for safety belt as claimed in claim 1, wherein said stationary contact strips mounted to said switch bracket are each formed with a stepped portion, and said contact pin is brought into contact with said stepped portions of said stationary contact strips when said slider is moved to the other of said predetermined positions by being urged by said inserted tongue plate.

4. A buckle for safety belt as claimed in claim 1, wherein said stationary contact strips mounted to said switch bracket are each formed with a stepped portion normally engaged by said contact pin fixed to said slider normally urged to the operative position by said spring means disposed in said switch bracket, and said contact pin is brought to the non-operative position when said slider is moved relative to said switch bracket by being urged by said inserted tongue plate.

5. A seat belt buckle having a switch assembly comprising:
   a bottom plate having a pair of upstanding walls extending from the opposite sides thereof respectively, each of which upstanding walls is bent at the upper end inwardly substantially normal to the wall to form a horizontally inwardly protruding flange, and a curved portion at one end;
   a buckle cover fixed detachably to said bottom plate to constitute together with said bottom plate a buckle casing having an internal space therein, said buckle casing being provided with an opening between said curved portion of the bottom plate and an opposite portion of the buckle cover, said buckle cover being provided in the top wall thereof with a slot for the unlocking manipulation;
   a tongue plate inserted through the opening into the buckle casing and drawn out of the buckle casing by the unlocking manipulation on the tongue plate locked in the buckle casing;

a switch bracket having an open bottom and fixed to said bottom plate within the internal space of the buckle casing, and including a pair of stationary contact strips mounted on said switch bracket at its opposite sides, each of contact strips being formed at one end thereof with a stepped portion and connected, at the other end thereof with a lead wire, a longitudinal guide slot bored in the top wall of said switch bracket, and a supporting portion formed integrally with the front end of said switch bracket for supporting the leading end portion of said tongue plate when the latter is inserted into said buckle casing;

a slider mounted to said switch bracket to be slidable relative to said switch bracket in the longitudinal direction thereof, and having a contact pin extending therethrough and protruding from the opposite side surfaces thereof in a direction substantially normal to the longitudinal axis thereof, an upstanding knob formed at the front end of the slide and projecting through said longitudinal guide slot into an interference contact position with said tongue plate to be inserted and a longitudinal cut-out formed between a pair of side wall portions of the rear end of said slider;

a coiled compression spring disposed between the inner end of said cut-out in said slider and the rear wall of said switch bracket for urging the slider normally to be maintained in one of two predetermined positions;

a locking lever disposed in the space defined between said buckle cover and said bottom plate of the buckle for locking said tongue plate in its inserted position, said locking lever being provided at one end thereof with means for receiving an unlocking force imparted thereto for the purpose of unlocking said inserted tongue plate from its locking position; and a leaf spring anchored at one end thereof to the other end of said locking lever and beared at the other end thereof against the lower part of said supporting portion of the switch bracket for normally urging the locking lever upwardly for swinging movement at said other end of the locking lever, whereby with the insertion of said tongue plate through said insertion opening of said buckle casing, said knob is engaged and urged by the leading end of said tongue plate to be moved along said guide slot and simultaneously said slider being moved in a parallel direction with the movement of the inserted tongue plate relative to said switch bracket to the other of said predetermined position against the force of said spring means thereby bringing said protruding contact pin to the other of said predetermined positions.

* * * * *